United States Patent [19]
Kaymer et al.

[11] Patent Number: 6,148,247
[45] Date of Patent: *Nov. 14, 2000

[54] EMBROIDERY MACHINE CONTROL

[75] Inventors: Andrew Bennett Kaymer, Loughton; Kelvin Maurice Cannon, Northampton, both of United Kingdom

[73] Assignee: Viking Sewing Machines AB, Huskvarna, Sweden

[*] Notice: This patent issued on a continued prosecution application filed under 37 CFR 1.53(d), and is subject to the twenty year patent term provisions of 35 U.S.C. 154(a)(2).

[21] Appl. No.: 08/922,584

[22] Filed: Sep. 3, 1997

[30] Foreign Application Priority Data

Sep. 9, 1996 [GB] United Kingdom ............... 9618750

[51] Int. Cl.[7] ........................................... G06F 19/00
[52] U.S. Cl. ................... 700/138; 700/137; 112/475.18; 112/475.19
[58] Field of Search ............................. 112/102.5, 456, 112/475.19; 700/131, 135, 137, 138

[56] References Cited

U.S. PATENT DOCUMENTS 3,744,035  7/1973  Geirhos et al. ............... 364/470.02
4,370,938  2/1983  Bergvall ............................ 112/158
4,422,394  12/1983  Bergvall ............................ 112/158
4,616,583  10/1986  Takano et al. ................. 112/121.12
5,319,565  6/1994  Hausammann et al. ......... 364/470.02
5,662,055  9/1997  Hartwig et al. ................. 112/102.5
5,740,056  4/1998  Futamura ........................ 364/470.09
5,771,173  6/1998  Tsonis et al. ................... 364/470.02

FOREIGN PATENT DOCUMENTS 2 240 193 A  7/1991  United Kingdom .
2 317 026 A  3/1998  United Kingdom .

*Primary Examiner*—Paul P. Gordon
*Attorney, Agent, or Firm*—Pearne & Gordon LLP

[57] ABSTRACT

A computer is operated to generate stitch data relating to an embroidery design. In the method of the invention, parameters of elements of the design are entered in the memory of the computer, said parameters being standard parameters for embroidering the design on a first type of material. First stitch data is then created in the memory of the computer for embroidering the design on the first type of material. Modified stitch data is then created in the memory of the computer for embroidering the design on a second type of material. The first stitch data or the modified stitch data, depending upon whether the design is to be embroidered onto the first type of material or onto the second type of material, is then written onto a storage medium.

15 Claims, 2 Drawing Sheets

EMBROIDERY MACHINE CONTROL

BACKGROUND OF THE INVENTION

This invention relates to a method of, and apparatus for, controlling an automatic embroidery machine.

Originally, embroidery machines used punched cards and/or paper tape data to produce the pantograph x/y movements required to stitch embroidery designs. Users were limited to costly preprogrammed designs that took days or weeks to be prepared by the punch houses.

Because many users wished to produce individual monograms or names, alone or in combination with designs (e(e for uniforms), a demand arose for lettering systems to be supplied with embroidery machines. These were initially fulfilled by electronic keyboard apparatus, which has preset sizes of various font styles of lettering stored in them. The user could choose a style and size, and type in the letters to be sewn. However, there was no ability to chancre sizes on a continuous scale, to alter parameters such as density and column width, or to put lettering on a curve and so on.

Eventually computer software systems were introduced (in the past 10 years or so). One main advantage was to make it easier to send design data to embroidery machines by using disks rather than paper tape. Another advantage was to allow users to manipulate preprogrammed designs, for example to rotate them, to mirror them, to resize them, to combine them, to see the effects of colour changes and to save altered designs as new designs. Some of these functions were previously available directly on the embroidery machines, but there was no way to visualise a change before it was implemented, which could be costly if there was a mistake, and this would lead to a waste of time and possibly to ruining garments being embroidered.

Embroidery is a three-dimensional product, the stitches of an embroidered letter (or any other design) covering a two-dimensional area, and also 'sitting' on top of the material to provide the third dimension ('height'). Different types of material can affect the three-dimensional appearance of embroidery stitched thereon. In this connection, there are two important elements, namely the depth of pile (or 'thickness') of the material, and the elasticity (or 'stretch') of the material.

As the pile or thickness increases, embroidery stitches tend to 'sink' into the material, so the same lettering would look flatter on a heavy pile fabric than on a flat woven one. Similarly, as materials become more elastic, embroidery stitches tend to pull in along their length and make the lettering look thinner. Neither of these effects is desirable. In many materials, the effects are interconnected, as when fabrics get thicker they often get more elastic The density of the stitches in the lettering can be adjusted to reduce the tendency of stitches to sink into fabric. One known way of doing this is to use the settings in a monogramming program. The program then calculates the number of stitches that are required to be placed for each of the letters of the design to be embroidered. A disadvantage of this method is that the operator must be an expert.

SUMMARY OF THE INVENTION

The present invention provides a method of operating a computer to generate stitch data relating to an embroidery design, the method comprising the steps of:

(a) specifying the type of material onto which the design is to be embroidered, (b) creating a set of parameters of elements of the design in the memory of the computer;

(c) creating stitch data from said set of parameters in the memory of the computer for embroidering the design on the specified type of material, and (d) writing the stitch data onto a storage medium.

In a preferred embodiment, step b) is such that the parameters of said set are standard parameters for embroidering the design on a first type of material;

step c) is such that:
  i) first stitch data is created in the memory of the computer for embroidering the design onto the first type of material, and
  ii) modified stitch data is created in the memory of the computer for embroidering the design onto a second type of material; and step d) is such that the first stitch data or the modified stitch data, depending upon whether the specified type of material is the first type of material or the second type of material, is written onto the storage medium.

Preferably, the modified stitch data is one of a plurality of different sets of modified stitch data, each modified set of stitch data being for embroidering the design on a different second type of material.

Advantageously, said parameters relate to the areas of said design elements.

Preferably, step c) is such that the modified stitch data varies the area of each design element to be embroidered.

Where the first type of material is a woven material, the modified stitch data increases the area of each design element to be embroidered.

Conveniently, step d) is Such that the stitch data is written onto a stitching card.

The invention also provides a stitching card whenever produced by the method defined above.

The invention further provides apparatus for generating stitch data relating to an embroidery design the apparatus comprising:

a) means for creating a set of parameters of elements of the design in the memory of the computer, b) means for creating stitch data from said set of parameters in the memory of the computer for embroidering the design onto a specified type of material, and c) means for writing the stitch data onto a storage medium.

In a preferred embodiment, the means for creating said set of parameters is such as to create standard parameters for embroidering the design onto a first type of material, the means for creating stitch data creates first stitch data for embroidering the design onto the first type of material, and modified stitch data for embroidering the design onto a second type of material; and the means for writing the stitch data writes the first stitch data or the modified stitch data, depending upon whether the design is to be embroidered onto the first type of material or onto the second type of material, onto the storage medium.

The invention still further provides a method of controlling an automatic embroidery machine to produce an embroidery design, the method comprising the steps of:

a) specifying the type of material onto which the design to be embroidered;

b) creating a set of parameters of elements of the design in the memory of the computer, c) creating stitch data from said set of parameters in the memory of the computer for embroidering the design onto the specified type of material;

d) writing the stitch data onto a storage medium;

e) reading, said stitch data from the storage medium; and f) controlling the embroidery machine using the stitch data to produce the design.

Preferably, step b) such that the parameters of said set are standard parameters for embroidering the design onto a first type of material;

step c) is such that:
   i) first stitch data is created in the memory of the computer for embroidering the design onto the first type of material; and
   ii) modified stitch data is created in the memory of the computer for embroidering the design onto a second type of material; and step d) is such that the first stitch data or the modified stitch data, depending upon whether the design is to be embroidered onto the first type of material or onto the second type of material, is written onto the storage medium.

The invention also provides a method of controlling an automatic embroidery machine to produce an embroidery design, the method comprising the steps of:

a) specifying the type of material onto which the design is to be embroidered;

b) creating a set of parameters of elements of the design in the memory of the computer;

c) creating stitch data from said set of parameters in the memory of the computer for embroidering the design onto the specified type of material; and d) controlling the embroidery machine using the stitch data to embroider the design onto the specified type of material.

Advantageously, step b) is such that the parameters of said set are standard parameters for embroidering the design onto a first type of material;

step c) is such that:
   i) first stitch data is created in the memory of the computer for embroidering the design onto the first type of material; and
   ii) modified stitch data is created in the memory of the computer for embroidering the design onto a second type of material; and step d) is such that the embroidery machine is controlled using the first stitch data or the modified stitch data, depending upon whether the design is being embroidered onto the first type of material or onto the second type of material.

BRIEF DESCRIPTION OF THE DRAWING

The invention will now be described in greater detail, by way of example only, with reference to the drawings, in which.

DETAILED DESCRIPTION OF THE PREFERRED EMBODIMENTS

Figure 1:
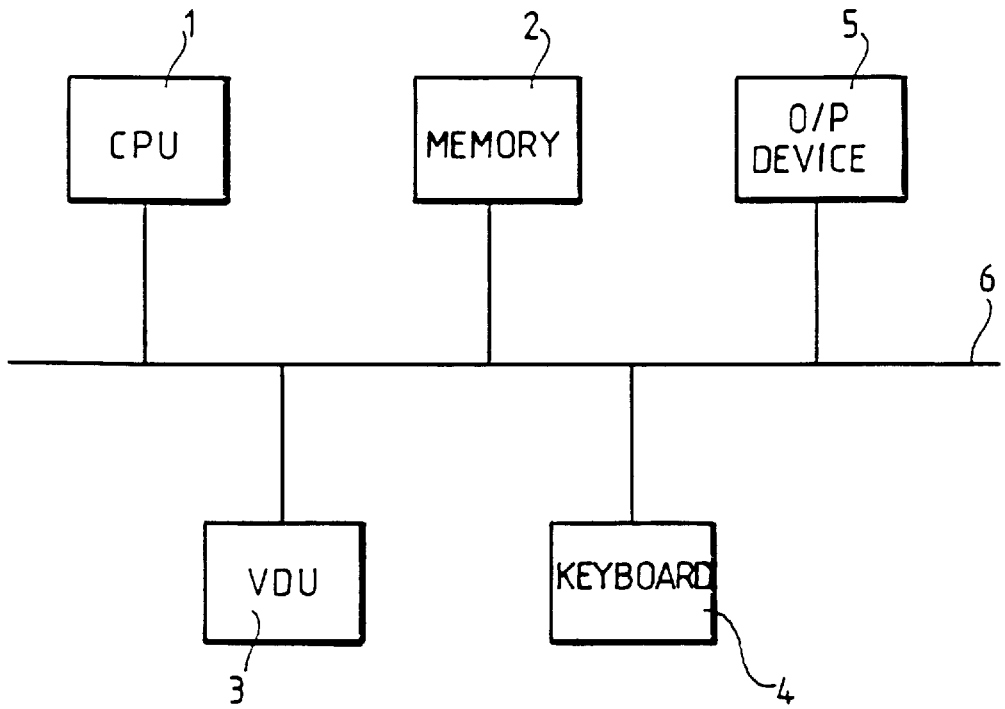
FIG. 1 is a block diagram of a computer which implements the stitch compensation system of the invention.

Referring to the drawings, FIG. 1 shows a computer (for example a PC) having a central processing unit (CPU) 1, a memory 2, a visual display unit (VDU) 3, a keyboard 4 constituting an input device, and a card writer 5 constituting an output device. The items 1 to 5 are interconnected by a bus 6. The computer is programmed to control the card writer 5 to store control data for each of a plurality (typically 36) of designs on a card (not shown).

Figure 2:
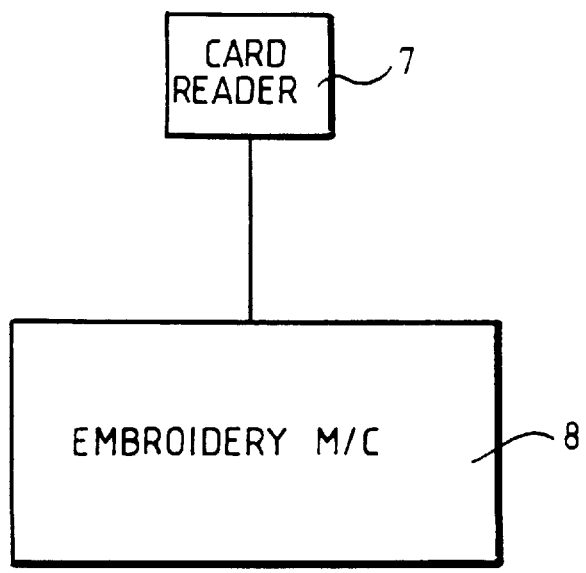
FIG. 2 is a block diagram of an embroidery machine for carrying out stitch compensation.
Figure 4A:
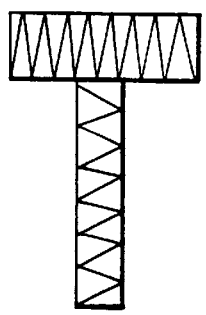
Figure 4B:
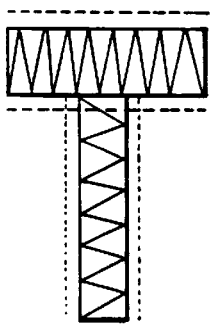
Figure 4C:
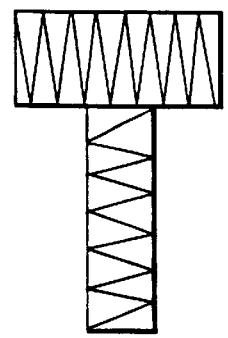

In use, the card is placed in a card reader 7 (see FIG. 2) associated with an automatic embroidery machine 8 Any one of the designs on the card can then be stitched by the embroidery machinery 8 using step commands for controlling x-axis and y-axis stepper motors (not shown) to execute the stitching pattern for a given design When stitching letters, each letter is divided into a plurality of sections (objects), in each of which the stitches are substantially parallel. This results in a more pleasing finished appearance than if adjacent stitches are angled relative to one another. Each object is defined by node points at its corners The algorithm which is used for compensating for different materials upon which a given lettering design is to be embroidered will now be described with reference to FIG. 4. FIG. 4 shows (in FIGS. 4a, 4b and 4c) the letter "T" which forms part of the lettering design. Each figure shows the letter "T" divided into two sections, and also shows where the algorithm places the stitches for best effect. At a given lettering size (chosen by the user), the algorithm calculates how to place the stitches to look best on a woven material (which is flat with little elasticity). The user can then use one of four other settings to represent materials with increasing elasticity and/or pile thickness, these materials being light knitwear, medium knitwear, heavy knitwear and fleece. For each ascending setting, the algorithm makes the areas of the sections of the letter proportionately larger, essentially producing a bolder letter. This is similar to using a bolder typeface in printing, where you have the same basic size or height for a letter but the sections are thicker With the compensation algorithm, however, the areas of the sections are made wider (as shown by the dotted lines in FIG. 4b). The algorithm then calculates how to place the stitches in the new, wider section areas, and produces the requisite stitching data. FIG. 4c shows the resulting stitch pattern where it is apparent that some of the stitches are longer than in the original stitching arrangement for woven material.

The stitch data required to stitch the design is then sent to the card writer 5 for writing the card. Once written, the card is transferred to the card reader 7 of the embroidery machine 8. This card reader 7 translates the stitched data into the pantograph x/y movements required to stitch the design.

The algorithm works by recreating areas, rather than altering the size of individual stitches. This is because purely increasing the length of stitches works well for straight areas, but not as effectively for curved areas. When stitches are placed in curved sections, some stitches on the outside of the curve should not reach the inside, otherwise stitches tend to bunch up as they go around the curve. The use of the algorithm avoids such problems, because it calculates stitches to fit within each area each time stitch data is created.

Figure 3:
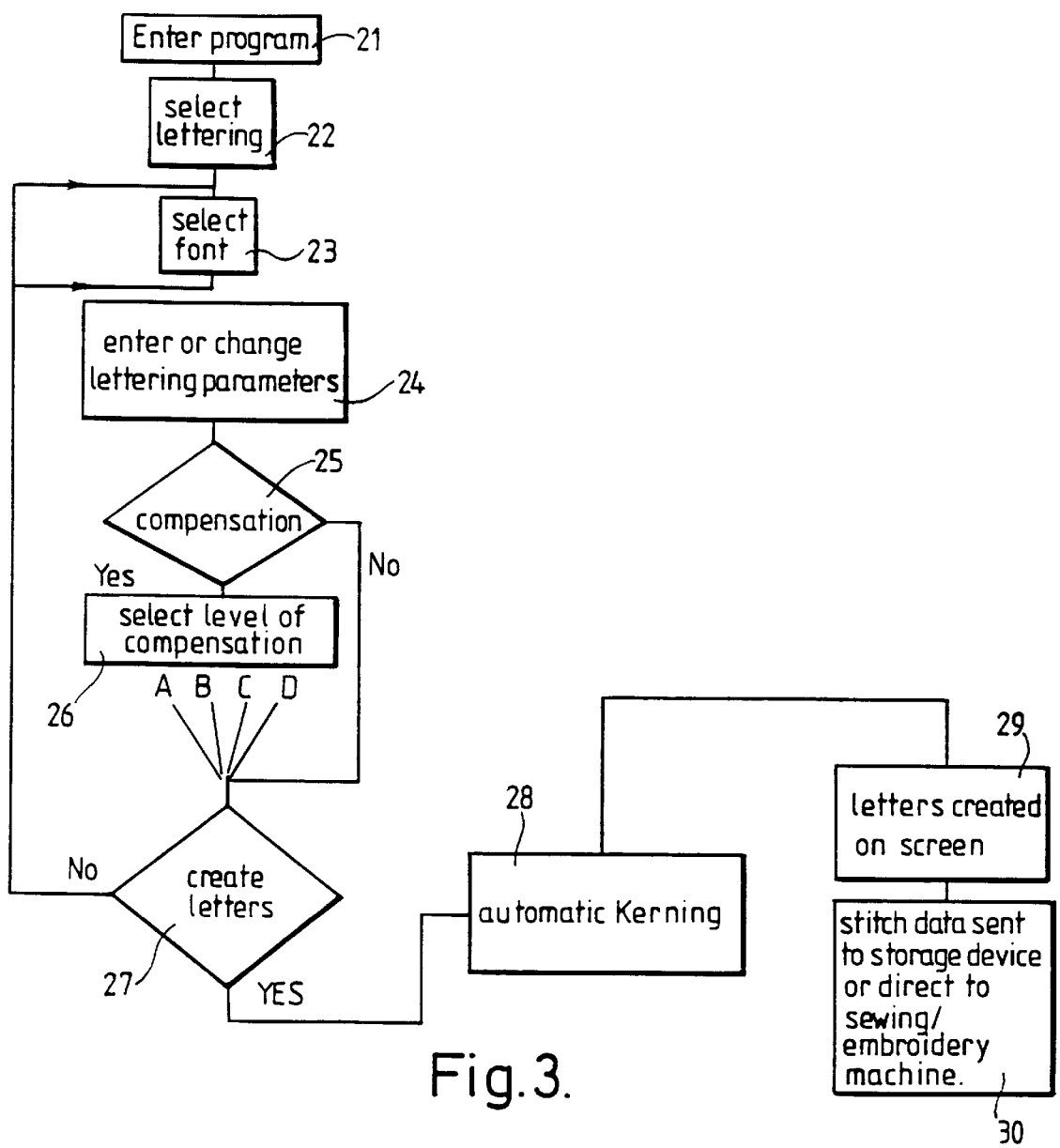
FIG. 3 is a flow chart of the steps carried out by the stitch compensation system" and FIGS. 4(a), 4(b), and 4(c) are diagrams illustrating the way in which the stitch compensation system varies the size of a letter and its stitches.

FIG. 3 is a flow chart illustrating the entire process. In a step 21, the main program is entered, this program being used to perform operations, such as rotation, upon subsequently entered designs, in a conventional manner. In a step 22, lettering is selected, thereby enabling that part of the main program dedicated to lettering control. Next, in a step 23, the desired font is selected. In a step 24, lettering parameters (such as height and width) are entered.

In a step 25, the algorithm calculates how in place the stitches to look best on woven material, and the user decides whether compensation is required, that is to say whether the material to be embroidered is a woven material (in which case no compensation is required, and the program goes on to a step 27), or the material is one of the other four materials mentioned above. In the latter case, the program moves on to a step 26, in which the user selects the level of compensation A to D suitable for the material concerned. The program then proceeds to the step 27 in which the actual letters of the design are entered, using the keyboard 4. The letters then appear on the screen of the VDU 3. If the appearance is not satisfactory, the program loops back to either the step 23 (to enable the font to be changed), or to the step 24 (to enable the letter parameters to be changed).

The program then moves to a step 28, in which the letters of the design are automatically kerned (this step being described in greater detail in the specification of our GB patent application 961 8753.9). At this stage, the program proceeds to a step 29, in which the letters are created on the screen of the VDU 3. In a step 30, the stitch data is then sent to the card writer 5. Alternatively, the stitch data could be sent directly to the automatic embroidery machine 8.

It will be apparent that the compensation method described above could be modified. Thus, after the step 29, the program could loop back to step 23 or step 24 to change the font or the lettering parameters. Moreover, although the method is intended primarily for lettering designs where the apparent size of the elements of a design are important, the method could also be used for any other type of embroidery design.

What is claimed is:

1. A method of generating stitch data relating to an embroidery design, the method comprising the steps of:
    (a) providing a computer having a memory;
    (b) specifying the type of material onto which the design is to be embroidered;
    (c) creating a set of parameters of elements of the design in the memory of the computer;
    (d) creating stitch data from said set of parameters in the memory of the computer based on the specified type of material; and
    (e) writing the stitch data onto a storage medium.

2. A method as claimed in claim 1, wherein:
    step c) is such that the parameters of said set are standard parameters for embroidering the design on a first type of material;
    step d) is such that:
        i) first stitch data is created in the memory of the computer if embroidering the design onto the first type of material; and
        ii) modified stitch data is created in the memory of the computer if embroidering the design onto a second type of material; and
    step e) is such that the first stitch data is written onto the storage medium if the specified type of material is the first type of material, and the modified stitch data is written onto the storage medium if the specified type of material is the second type of material.

3. A method as claimed in claim 2, wherein the modified stitch data is one of a plurality of different sets of modified stitch data, each set of modified stitch data being for embroidering the design on a different second type of material.

4. A method as claimed in claim 2, wherein said parameters relate to the areas of said design element and step d) is such that the modified stitch data varies the area of each design element to be embroidered.

5. A method as claimed in claim 4, wherein the first type of material is a woven material, and the modified stitch data increases the area of each design element to be embroidered.

6. A method as claimed in claim 1, wherein said parameters relate to the areas of said design elements.

7. A method as claimed in claim 1, wherein step e) is such that the stitch data is written onto a stitching card.

8. Apparatus for generating stitch data relating to an embroidery design, the apparatus comprising:
    a) a memory;
    b) means for creating a set of parameters of elements of the design in the memory;
    c) means for creating stitch data from said set of parameters in the memory based on a specified type of material; and
    d) means for writing the stitch data onto a storage medium.

9. The apparatus of claim 8, wherein the apparatus is a computer.

10. Apparatus as claimed in claim 8, wherein the means for creating said set of parameters creates standard parameters for embroidering the design onto a first type of material; and
    wherein the means for creating stitch data creates first stitch data if embroidering the design onto the first type of material, and creates modified stitch data if embroidering the design onto a second type of material; and
    wherein the means for writing the stitch data writes the first stitch data onto the storage medium if the specified type of material is the first type of material, and writes the modified stitch data onto the storage medium if the specified type of material is the second type of material.

11. A method of controlling an automatic embroidery machine to produce an embroidery design, the method comprising the steps of:
    a) providing a computer having a memory;
    b) specifying the type of material onto which the design is to be embroidered;
    c) creating a set of parameters of elements of the design in the memory of the computer;
    d) creating stitch data from said set of parameters in the memory of the computer based on the specified type of material;
    e) writing the stitch data onto a storage medium;
    f) reading said stitch data from the storage medium; and
    g) controlling the embroidery machine using the stitch data to produce the design.

12. A method as claimed in claim 11, wherein:
    step c) is such that the parameters of said set are standard parameters for embroidering the design onto a first type of material;
    step d) is such that:
        i) first stitch data is created in the memory of the computer if embroidering the design onto the first type of material; and
        ii) modified stitch data is created in the memory of the computer if embroidering the design onto a second type of material; and
    step e) is such that the first stitch data is written onto the storage medium if the specified type of material is the first type of material, and the modified stitch data is written onto the storage medium if the specified type of material is the second type of material.

13. A method as claimed in claim 11, wherein a stitching card constitutes the storage medium.

14. A method of controlling an automatic embroidery machine to produce an embroidery design, the method comprising the steps of:
   a) providing a computer having a memory;
   b) specifying the type of material onto which the design is to be embroidered;
   c) creating a set of parameters of elements of the design in the memory of the computer;
   d) creating stitch data from said set of parameters in the memory of the computer based on the specified type of material; and
   e) controlling the embroidery machine using the stitch data to embroider the design onto the specified type of material.

15. A method as claimed in claim 14, wherein:
   step c is such that the parameters of said set are standard parameters for embroidering the design onto a first type of material;
   step d is such that:
   i) first stitch data is created in the memory of the computer if embroidering the design onto the first type of material; and
   ii) modified stitch data is created in the memory of the computer if embroidering the design onto a second type of material; and
   step e is such that the embroidery machine is controlled using the first stitch data if the specified type of material is the first type of material, and is controlled using the modified stitch data if the specified type of material is the second type of material.

* * * * *